United States Patent [19]

Wetmore

[11] Patent Number: 4,457,381
[45] Date of Patent: Jul. 3, 1984

[54] STUBBLE MULCH SWEEP

[75] Inventor: Halsey J. Wetmore, Guymon, Okla.

[73] Assignee: Adams Hard-Facing Company, Inc., Guymon, Okla.

[21] Appl. No.: 529,525

[22] Filed: Sep. 6, 1983

Related U.S. Application Data

[63] Continuation of Ser. No. 315,912, Oct. 28, 1981, abandoned.

[51] Int. Cl.³ .................................... A01B 39/20
[52] U.S. Cl. .............................. 172/722; 172/726; 172/730
[58] Field of Search .............. 56/229; 172/19, 699, 172/720, 722, 724, 726, 730

[56] References Cited

U.S. PATENT DOCUMENTS

| | | | |
|---|---|---|---|
| 1,058,970 | 4/1913 | Hauser | 56/229 |
| 1,569,271 | 1/1926 | Ewasen | 172/722 |
| 2,094,424 | 9/1937 | Cole | 172/726 |
| 2,242,426 | 5/1941 | Gregory et al. | 172/722 |
| 2,337,777 | 12/1943 | Seaholm | 172/722 |
| 2,764,924 | 10/1956 | Degge | 172/722 |

OTHER PUBLICATIONS

Ad–"The Lubbock Plow", 11-7-74.

Primary Examiner—Gene Mancene
Assistant Examiner—David L. Tarnoff
Attorney, Agent, or Firm—William R. Laney

[57] ABSTRACT

A stubble mulch sweep including a pair of divergent wings each detachably connected at one end to a rigid overlay of V-shaped cross section. The overlay tapers to a piercing point of hardened, abrasion resistent metal at its forward end. Each wing is characterized by a convexly curved upper surface, and tapers to cutting edges at opposite sides of the respective wing.

1 Claim, 4 Drawing Figures

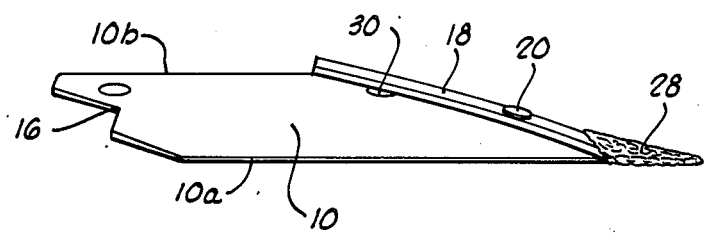
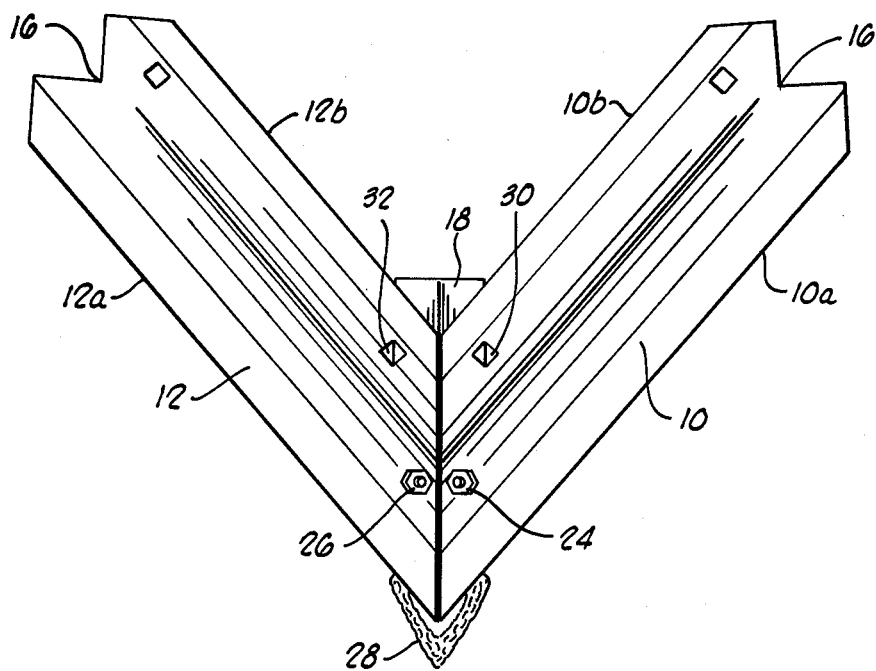
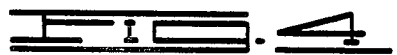

STUBBLE MULCH SWEEP

This application is a continuation of patent application Ser. No. 315,912, filed Oct. 28, 1981, which is now abandoned.

BACKGROUND OF THE INVENTION

1. Field of the Invention

This invention relates to tillage tools, and more particularly, to a stubble mulch sweep which can be effectively employed in stubble mulching in situations where a long service life sweep is desirable.

2. Brief Description of the Prior Art

Stubble mulch sweeps characterized in having a pair of divergent wings joined at a central axis and having a piercing point at the leading end thereof have long been used in agriculture. Various ways of constructing these sweeps have been utilized, but present construction, so far as is known, calls for joining the two divergent wing plates along a central axis by welding.

In earlier years, the Minneapolis Moline Company provided a rigid central anchor piece which was provided with slots on either side of the center line, and these slots accommodated inter-fitting wings which were pressed into the slots. The wings themselves were bolted to the frog of the plow, and this held the central casting into which the wings were inserted in position. This construction was not totally satisfactory for the reason that over extended periods of use, the slotted interfitment ultimately became loosened, and certain areas would wear away in the case of use in rocky soils relatively quickly and cause the sweep to become ineffective and damaged beyond further usage.

Several years prior to the present time, Calkins Manufacturing Company manufactured a three-piece sweep structure with a separate central piece which tapered to a large point at the leading end. Both the point of the central piece and the wings bolted to the frog of the plow.

Efforts at providing a three-piece sweep have been discontinued in favor of the described present construction where the wings are rigidly connected to each other by welding along a central axis at the point of convergence of the wings.

BRIEF DESCRIPTION OF THE PRESENT INVENTION

The present invention provides an improved stubble mulch sweep which includes a pair of divergent wings each detachably connected at one end to a rigid central overlay of V-shaped cross-section. The overlay tapers to a piercing point of hardened, abrasion resistent metal at its forward end. Each of the wings is characterized by a concavely curved upper surface and tapers to cutting edges at its opposite sides. Bolt holes are provided through the wings at locations spaced from the points of securement of the wings to the central overlay, and are positioned alongside the overlay to facilitate bolting the wings to the frog of the plow.

An important object of the present invention is to provide a sweep construction where the wings of the sweep can be changed out to increase or decrease their length, as may be desired, and to replace them both with wings having different wear characteristics for certain types of utilization.

Another object of the invention is to provide a demountable sweep construction where the wings can be removed from their operative position of attachment to a central overlay piece and folded into juxtaposition, bolted to the central overlay and thus collapsed into a compact configuration for purposes of shipment and storage.

An additional object of the present invention is to provide a stubble mulch sweep which is less bulky in shipment, but more easily and quickly mounted to the frog of a plow preparatory to utilization.

An additional object of the invention is to provide a divergent winged sweep implement for use in agriculture which reduces the abrasive wear experienced at the zone of joinder of the sweep wings.

Another advantage of the stubble mulch sweep of the invention is to permit the farmer to replace either the left or the right wing of the sweep if it should be fractured or damaged in use, without the requirement to replace the entire sweep or any other part thereof.

A further object of the invention is to provide a special nosepiece integrally formed with the central overlay employed to hold the two sweep wings in proper operative position so that the nosepiece of the overlay acts as a wear bar of superior shape and better wearing characteristics as compared to the conventional sweep nose.

Additional objects and advantages of the invention will become apparent as the following detailed description of the invention is read in conjunction with the accompanying drawings which illustrate a preferred embodiment of the invention.

GENERAL DESCRIPTION OF THE DRAWINGS

FIG. 3 is a side elevation view of the stubble mulch sweep.

FIG. 4 is a bottom plan view of the stubble mulch sweep of the invention.

DETAILED DESCRIPTION OF A PREFERRED EMBODIMENT OF THE INVENTION

Figure 1:
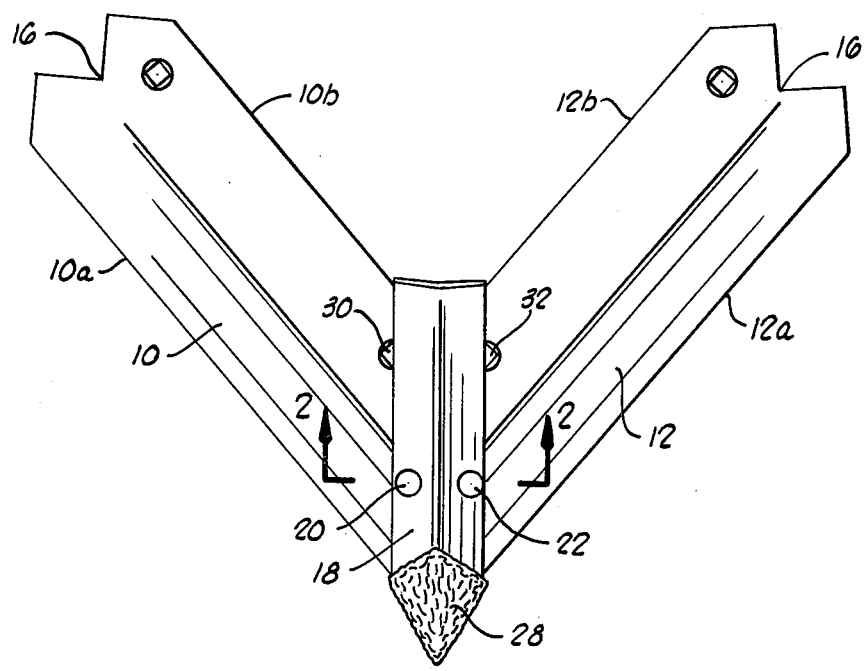
FIG. 1 is a plan view of a stubble mulch sweep constructed in accordance with the present invention.
Figure 2:
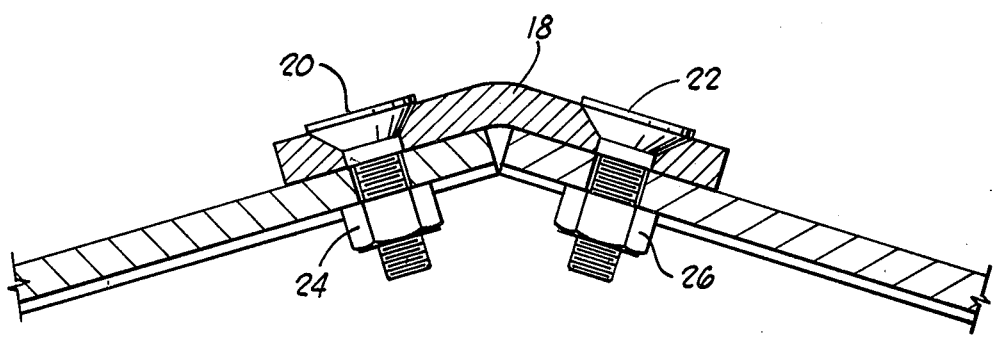
FIG. 2 is a sectional view taken along line 2—2 of FIG. 1.

Referring initially to the drawings, the stubble-mulch sweep of the invention includes a pair of divergent wing plates 10 and 12. The swing plates 10 and 12 include convexly curved upper surfaces which taper to a pair of relatively sharp side edges 10a–10b and 12a–12b, respectively. Each wing uplate is cut along an angle extending transversely across the plate at its forward end, and includes a bifurcation 16 at its rearward end. The forward ends of the two wing plates are bolted to an elongated rigid overlay 18 of V-shaped cross-section. A pair of bolts 20 and 22 are thus countersunk into holes formed in the upper side of the overlay as shown in FIG. 2, and nuts 24 and 26 are used to tightly lock the bolts in position to hold the two wing plates in abutting contact beneath the lower side of the rigid overlay 18.

At its forward end, the overlay has a point 28 of hardened, abrasion resistent metal, such as chromium carbide, formed thereon, and such point tapers both downwardly and convergently to a tip at the forward end thereof.

Each wing plate 10 and 12 is further provided with a hole, 30 and 32, respectively, spaced rearwardly from the bolt holes used for attaching the wing plates to the rigid central overlay, and spaced from each other so as to be positioned alongside the lateral edges of the rigid central overlay 18. The bolt holes 30 and 32 are employed for bolting the wing plates 10 and 12 to the frog of the implement used to support the stubble mulch sweep.

At such time as it may be desired to replace the wing plates 10 and 12, this is a simple matter involving the unbolting of the wing plates, and their replacement by re-bolting new wing plates to the rigid central overlay 18. In similar fashion, though such seldom is required, a new rigid central overlay replacement can be bolted to a pair of wings already used. It will be apparent that this flexibility permits the length and configuration of the wings to be varied or changed, if this should be desired.

The particular shape of the rigid central overlay, and particularly, the hard metal point 28 located at the forward end thereof provide extended service life to the stubble mulch sweep and aid in protecting the sweep from abrasion and wear. The pointed forward end overlies and protects the foremost ends of the two wing plates 10 and 12. (See FIG. 4).

From the foregoing description of the invention it will be perceived that the present invention provides an improved stubble mulch sweep which can be usefully employed in rocky and abrasive soils, which sweep is flexible in utilization and characterized in having a long and trouble-free service life.

Although a preferred embodiment of the invention has been herein described in order to illustrate the basic principles of the invention, various changes and innovations can be made in the illustrated structure without departure from these basic principles. Such changes are deemed to be circumscribed by the spirit and scope of the invention except to the extent that the same may be necessarily limited by the appended claims, or reasonable equivalents thereof.

What is claimed is:

1. A stubble mulch sweep comprising:

a pair of divergent wing plates terminating in parallel inner edges abutting along a line, said wing plates each having a pointed forward end and having convergent forward side edges converging at the pointed forward ends of said wing plates, said wing plates lying in two planes intersecting each other adjacent said line of abutment, which planes define a downwardly opening obtuse angle, each of said wing plates having a convexly curved upper surface, and each of said wing plates further having rear side edges extending substantially parallel to said forward side edges, and each of said wing plates defining a bifurcation located intermediate its forward side edge and its rear side edge, and each further defining a first bolt hole with the first bolt holes in the two wing plates located on opposite sides of said abutting inner edges;

a central overlay of V-shaped transverse cross-sectional configuration contacting the upper side of said wing plates and including parts lying in two planes extending parallel to the two planes in which said wing plates lie, and having holes formed therethrough in alignment with said first bolt holes in said wing plates, said overlay extending from adjacent the forward ends of said wing plates past the rear of the abutting inner edges thereof, and said overlay having a pair of parallel lateral side edges disposed on opposite sides of, and spaced from, the abutting inner edges of said divergent wing plates;

bolts extending through said first bolt holes in said wing plates and said holes in said central overlay and detachably and individually securing said wing plates to said central overlay with said inner edges located in the described abutting relationship, said first bolt holes being spaced between said forward side edges and said rear side edges at a location such that said bolts and the abutting status of said wing plates cooperate to stably support said plates beneath said overlay without further bolting to a frog, yet permit each of said plates to be individually removed from said frog and replaced with the removal of only one of said bolts and without the necessity for removing the other of said wing plates, and further permitting said overlay to be removed from said wing plates without detachment or removal of said wing plates when said wing plates are bolted to a frog; and a forward point of hard abrasion-resistant metal secured to the forward end of said central overlay and positioned to overlie and protect the foremost parts of said wing plates, said forward point having a forward tip which lies ahead of, and is positioned at least as low as, the pointed forward ends of said wing plates, and said point further having side portions extending rearwardly from said forward tip along the convergent forward side edges of said wing plates, and being disposed at least as low as said convergent forward side edges of said wing plates whereby said point diverts soil from contact with the forward ends of said wing plates and a portion of the convergent forward side edges thereof adjacent said forward ends, said point sloping upwardly and rearwardly from said forward tip to a location over the central axis of said central overlay;

each of said divergent wing plates defining a second bolt hole spaced rearwardly therealong from the respective first bolt hole in the respective wing plate and disposed immediately adjacent a lateral side edge of said central overlay to facilitate bolting of said stubble mulch sweep to the frog of an implement by extension of bolts through said second bolt holes in said wing plates at a location abutting and stabilizing said overlay whereby each of said wing plates may be debolted from the implement frog and from said overlay without detaching the other of said wing plates from said frog, and whereby said overlay may be debolted from said wing plates and replaced without debolting either of said wing plates from the frog, and whereby both of said wing plates may be debolted from said frog with said overlay remaining bolted to said wing plates.

* * * * *